June 4, 1968  F. C. BADALICH  3,386,636

LOW POWER INTERMITTENT DRIVE WITH GEAR ASSIST

Filed July 21, 1966  2 Sheets-Sheet 1

INVENTOR.
Frank C. Badalich
BY
John E. Peele Jr.
Atty

June 4, 1968   F. C. BADALICH   3,386,636
LOW POWER INTERMITTENT DRIVE WITH GEAR ASSIST
Filed July 21, 1966   2 Sheets-Sheet 2
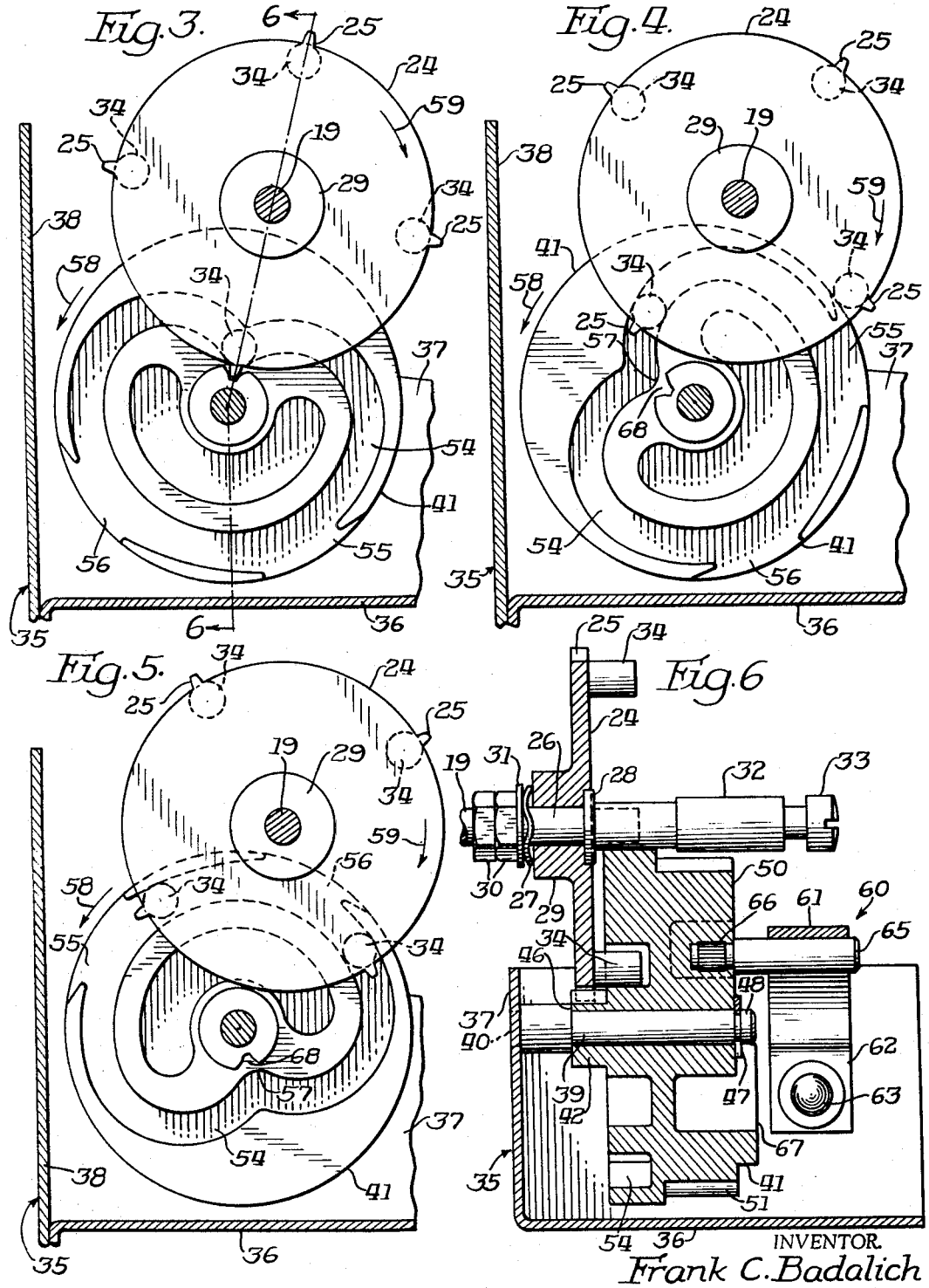
INVENTOR.
Frank C. Badalich
BY John E. Peele Jr.
Atty.

3,386,636
LOW POWER INTERMITTENT DRIVE WITH GEAR ASSIST

Frank C. Badalich, Chicago, Ill., assignor to Bell & Howell Company, Chicago, Ill., a corporation of Illinois
Filed July 21, 1966, Ser. No. 566,840
5 Claims. (Cl. 226—76)

The present invention relates to intermittent motion mechanisms. Particularly the invention relates to improvements in a cam assembly adapted for control of intermittent film movement in a strip film projector, such device exemplifying one type of apparatus in which intermittent motion is produced.

A strip film projector differs from a moving picture projector in that the latter apparatus is adapted rapidly to project separate film frames in uniform succession to impart a sense of continuity of motion; whereas, the former is adapted for the holding of successive film frames in projection position for varying periods to permit an audience to understand each as it is projected as a separate subject without intention of necessarily imparting continuity of movement to the successive projected images. To the end that strip films may be most efficiently handled, projectors therefor may be equipped for remote or automatic and manual control.

A strip film projector comprises a film frame changing sprocket-like feed member which is mounted on a manually or a remotely controllable shaft. Movement of the shaft is governed customarily by a Geneva device which, as it rotates, causes intermittent advancement of successive film frames. The ordinary Geneva device comprises a pin-carrying drive wheel and a thereby driven Geneva star wheel. The drive and the driven wheels operate at a speed ratio of 4 to 1 as the pin of the former wheel successively engages in the circularly concave peripheral conformations of the latter wheel.

A strip film projector cam assembly comprising a drive wheel with a heart-shaped cam groove and a driven pin-carrying wheel, having a 4 to 1 speed ratio between the drive and driven wheels, has been found more desirable for strip film feed control than an ordinary Geneva device because it permits smoother operation and a higher rate of frame change while reducing projector power requirements. Moreover, it allows a simple construction for manual film frame control in a projector. The heart-shaped cam assembly heretofore known, has a short coming inherent in the nature of its design from which there is a likelihood of jamming of the drive and driven wheels. By reason thereof use of that prior assembly is contraindicated for strip film projectors.

It is an object of the present invention to provide an improved intermittent motion mechanism.

It is a further object of the invention to provide an improved cam drive assembly of the character indicated.

It is another object of the invention to provide means in combination with such last mentioned assembly to preclude jamming of its components.

It is an additional object of the invention to provide an improved film frame-change control for a strip film projector.

Moreover, it is an object of the present invention that such control includes manually operable relatively driven cam and follower means for film frame changing together, and intermittently interlockable means to prevent jamming of the cam and cam follower.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

On the drawings:

FIGS. 3, 4 and 5 are similar elevational views of the cam and cam follower of said cam assembly looking at the side thereof opposite to the side shown in FIG. 2, however, illustrating various angular aspects.

FIG. 6 is a planar projection of a view taken along the broken section line 6—6 of FIG. 3 and looking in the direction of the arrows.

Figure 1:
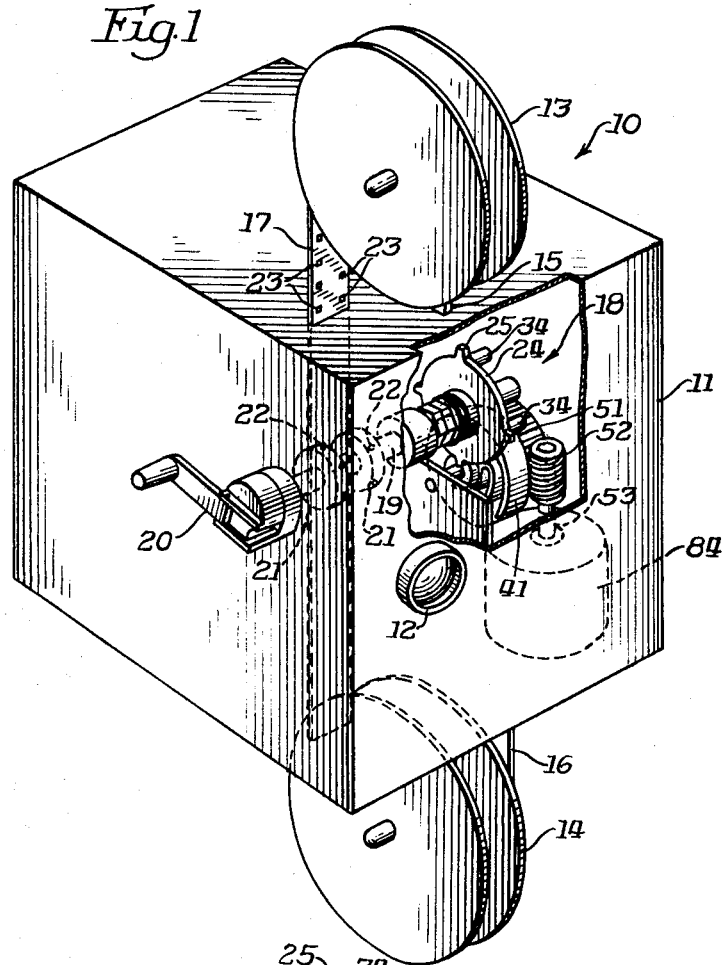
FIG. 1 is a perspective view of a strip film projector comprising a cam assembly embodying one form of the present invention, parts being broken away and parts being shown dotted for the purpose of illustration.

Referring now more particularly to FIG. 1, there is shown a strip film projector generally designated 10 comprising an apertured casing 11 equipped with a customary forward projector lens assembly 12. A reversible web supply reel 13 and a reversible web take-up reel 14 are carried rotationally in spaced apart vertical relationship above and below and adjacent casing 11 on a pair of reel mount members 15 and 16.

A web or strip film 17 comprising a plurality of adjacent transparency frames has opposite ends (not shown) connected by conventional means about the hubs of reels 13 and 14 for motivation between said reels in a vertical path through the casing 11 between a light source such as a lamp (not shown) and the lens assembly 12. Thereby frame images may be projected in a usual manner. Means for controlling reversible movement of the reels 13 and 14 may be conventional and accordingly have not been shown. An intermittent and reversible feeding mechanism comprising a gear or cam assembly generally designated 18 is adapted for reversible feeding control of the web 17 and comprises the invention which is shown in the various views in detail.

The opposite margins of the web 17 have a plurality of perforations 23 (only some of which have been numbered in the drawings). Said perforations are aligned in pairs transversely of the longitudinal axis of the unwound part of said web and facilitate reversible feeding thereof in a manner which is known in the art and which will be further elaborated upon hereinafter. Furthermore, perforations 23 are spaced from each other longitudinally of the strip at usual intervals whereby web 17 is movable successive distances, each equal to a single frame, as will be hereinafter further apparent.

The cam assembly comprises a shaft 19 (FIG. 1) which is suitably journalled within the projector casing 11 and defines an axis of rotation extending transversely of the path of web movement. A handle assembly 20 disposed outside casing 11 adjacent a side wall thereof is secured to an end portion of the shaft 19 for manual control thereof.

A pair of sprocket wheels 21 (FIG. 1) are secured within housing 11 to the shaft 19 for rotation therewith. The sprocket wheels are spaced apart longitudinally of said shaft in alignment with opposite marginal perforations 23. The sprocket wheels 21 have a plurality of teeth 22, the teeth of each sprocket wheel being circumferentially spaced to engage in corresponding marginal perforations 23 for motivation of the web 17 according to the angular direction of the shaft 19. The arrangement and proportioning of the parts heretofore defined is such that for each 90° rotation of the shaft from a previous angular disposition, a film frame adjoining that in projection position will be positioned in projection alignment with the lens assembly 12.

A gear fashioned as a centrally apertured preferably circular indexing pin plate or disc 24 is secured within casing 11 to an inner end portion 26 (FIG. 6) of the shaft 19 opposite the handle 20. Pin disc 24 is disposed in a plane perpendicular to shaft 19 and has four radially extending sprockets or gear-like teeth 25 which are disposed in the plane of said disc and spaced circumferentially, each from the other, by 90°.

Any suitable means may be used to secure the pin disc 24. Found adequate are a pair of opposed lock nuts 30 which are screw-threaded on the shaft 19 between the sprocket wheels 21 and the pin disc. The lock nuts define a fixed abutment to limit motion of said pin disc longitudinally of shaft 19 toward handle assembly 20. To cushion the abutment, a washer 31 and spring 27 are arranged about shaft 19 between the hub 29 of the pin disc and said nuts.

A washer 28 mounted about shaft end portion 26 seats in a recess in the face of the disc 24 which is opposite the face thereof proximate the spring 27. The washer is retained by an elongated nut 32 which is threaded on the inner end of shaft 19 and retained by means including a screw 33.

A cam follower 34 in the nature of a pin is associated with each sprocket or gear tooth 25. An inner end of each of the cam followers 34 is rigidly secured to the pin disc 24 adjacent its associated tooth; and said cam followers 34 project normally from said pin disc with their axes parallel to the shaft 19.

A cam mount 35 is suitably supported within the projector casing 11. Said cam mount comprises what may be considered a horizontal base 36, a vertical shaft mounting or side plate 37, which is disposed in a plane perpendicular to the shaft 19, and a vertical end plate 38, which is disposed normally to side plate 37. A stub shaft 39 (FIG. 6) which is disposed parallel to and below the shaft 19 has an end portion journalled in any suitable fashion in the plate 37 from which said shaft 39 projects normally. A cam wheel or disc 41 comprises the drive gear section of assembly 18 and is retained on the shaft 39 for rotation therewith. To prevent displacement of said cam disc axially of shaft 39, said cam disc has a hub extension 42 which projects toward side plate 37 in abutment with a bearing spacer 46 mounted about stub shaft 39 in engagement with side plate 37. A tension spring 47, which is retained in a recess formed in the free end portion 48 of the stub shaft 39 holds the cam disc against said bearing spacer by pressing against the outer face 50 of said cam disc.

The cam disc comprises an integral section fashioned as an external gear 51 arranged concentrically with stub shaft 39. A worm gear 52 is arranged in operable mesh with said gear 51. A shaft 53, which is shown as being the work extension of an electric motor 84, (FIG. 1) is suitably mounted within the casing 11 and rotatably supports the worm gear 52. The motor 84 is reversible and may be operated by a remote manually controllable switch (not shown) which optionally may require separate actuation for each advancement or movement of the web 17 from frame to frame or be arranged for automatic movement of the web frames sequentially at predetermined intervals.

In the present embodiment, the arrangement of the parts is such that for each complete rotation of the cam disc 41, the pin disc 24 will be driven through 90° in a corresponding angular direction. Accordingly, therefore, the web 17 will be moved in a corresponding direction a distance equal to the height of one film frame. To achieve that result, particularly, the inner face of the cam disc 41 is provided with means which defines a heart-shaped cam track 54. The cam track has a pair of angularly spaced apart gates 55 and 56 which open the track 54 over the periphery of the disc 41. The gates 55 and 56 are arranged and proportioned in a manner such that the gate 55 is a cam follower entrance to the track 54, whereas, the gate 56 is an exit to said cam track when the cam disc rotates in the direction of arrow 58. The gates serve in reverse upon reverse rotation.

The cam track 54 is disposed in operable alignment with the cam followers 34 so that as the cam disc rotates in either direction, the cam followers will successively enter and leave the cam track. However, the arrangement and proportioning of parts is such that when any cam follower 34 is disposed in the clevis or recess 57 of the cam track, the other cam followers 34 are disposed out of the cam track, in angular relationship as shown in FIG. 3.

Upon rotation of the cam disc 41, counterclockwise with respect to FIGS. 3, 4 and 5, for example, pin plate 24 will be rotated oppositely or clockwise, in the direction of the arrow 59 by reason of the coaction of the cam and each follower which enters track 54. The arrangement and proportioning of the track 54 and the cam followers 34 including the position of the gates is such that, when the cam disc 41 is rotated, in the direction last aforedescribed, just slightly beyond the position of FIG. 4, the follower 34 next upstream of the follower then in the cam track, will enter the gate 55. As the cam disc 41 continues to rotate just beyond the position illustrated in FIG. 5, the cam follower which was originally in the cam track 54 in FIG. 3, will exit through the gate 56.

Figure 2:
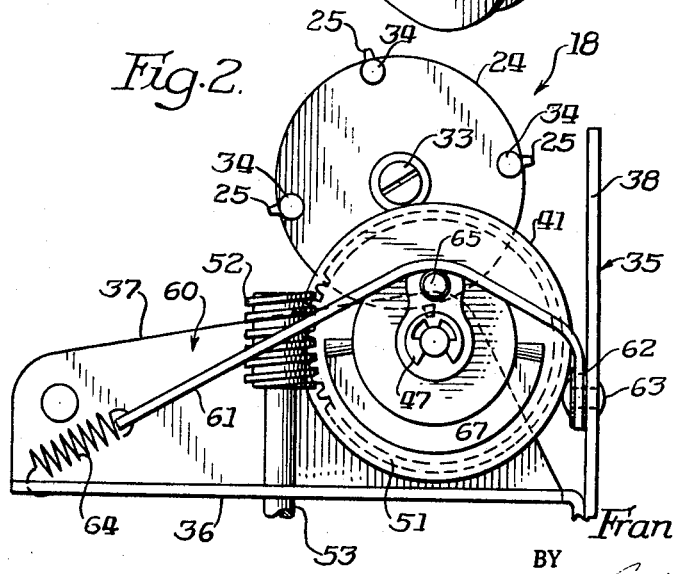
FIG. 2 is an elevational view of said cam assembly.

Fashioned integrally with the surface 50 of the gear section 51 may be an arcuate shoe-shaped switch trip 67 (FIGS. 2 and 6) which is adapted during each rotation to engage a switch (not shown) to control the power to the motor 84 whereby the drive for the web 17 can be stopped each time a film frame has moved into projection position. The arrangement and disposition of the switch trip 67 is such that synchronization occurs which permits the motivation of successive web frames into precise projection positions. Neither this feature nor the circuitry for automatic control of the cam disc 41 or the motor 84 are limiting on the present invention and, accordingly, further description thereof is omitted.

To overcome rotational inertia of said cam disc during remote operation, a brake assembly 60 (FIGS. 2 and 6) is employed. The brake assembly comprises a brake band 61 having a curved medial portion. One end portion is anchored by means of an expansion spring 64. One end portion of spring 64 is secured to the cam mount base 36 and the other end portion is anchored on said brake band 61. The inner end portion of a brake pin or shaft 65 has a knurled collar 66 (FIG. 6) which is eccentrically press-fit into the cam disc 41. From the surface 50 of the cam disc, the brake pin or shaft 65 extends normally below and into operable alignment with the medial part of the brake band. The arrangement is such that during each rotation of the cam disc 41 the brake pin will be carried into and out of frictional engagement with the brake band. By suitable control of the radii of the pin 65 and the band 61 the cam disc 41 can be selectively stopped or slowed.

The cam disc 41 has a hub 42 (FIGS. 4 and 5) in which there is fashioned a recess or pocket 68. The pocket or recess 68 is disposed adjacent the clevis 57 for reception of successive sprockets 25 as adjacent or corresponding of the cam followers 34 become disposed in the clevis. The recess or pocket 68 thereby serves to positively control movement of the pin disc 24 relative the cam disc 41 at times when only a single cam follower 34 is disposed in the cam track but in non-driving relationship. Thereby, jamming of any of the cam followers 34 in the cam track adjacent clevis 57 is precluded in the event of accidental non-cam movement of the handle 20.

In the absence of the positive locking arrangement provided by coaction of the sprockets 25 and pocket 68, likelihood of jamming of the followers in the track 54 exists as a hazard as long as the handle assembly can cause the cam followers 34 to move independently of movement of the cam disc. This can be overcome only by constant and careful attention to the management of the handle to a degree which makes the mechanism undesirable. No such occurrence is possible using the cam assembly 18 improved in the manner herein taught.

As many substitutions or changes could be made in the above described construction and as many apparently widely different embodiments of the invention within the scope of the claims could be constructed without departing from the scope and spirit thereof, it is intended that all matter contained in the accompanying specification shall be interpreted as being illustrative and not in a limiting sense.

What is claimed is:

1. A web advancing mechanism adapted for a film strip projection apparatus in which individual film frames comprising said web are intermittently moved to projection position in response to separate controlled motivating torques, the web advancing mechanism comprising
   a sprocket shaft;
   sprocket means mounted for corotation with said sprocket shaft and adapted for engagement with a film strip for advancement thereof;
   a pair of gears arranged in driving and driven relationship to rotate said sprocket shaft, said gears respectively having a curved cam track and comprising cam follower means arranged for coaction to cause relative rotation of said gears only during a portion of each cycle of the driving of said gears, and
   auxiliary gear control means arranged beyond said cam track to cause said gears to rotate together when in non-cam driving relationship and upon movement of the driven gear.

2. A mechanism as defined in claim 1 in which a first of said gears is secured to said sprocket shaft and arranged to be driven partially through one cycle for each cycle of the second of said gears, said gears defining a pair of rotatable discs arranged in parallel planes, said cam follower means comprising members projecting normally from the disc comprising said first gear, said cam track means being carried on the disc comprising said second gear.

3. A mechanism as defined in claim 2 in which the auxiliary gear control means comprises a radial sprocket arranged about said first gear adjacent each normally projecting member, and means defining a groove adjacent the second gear and corotational therewith, said groove disposed for successive reception of the radial sprockets.

4. An intermittent motion mechanism comprising drive and driven gears having a speed ratio of $x$ to 1 in which $x$ is a whole number multiple of 1, the driven gear comprising a disc with a plurality of cam follower projections, the drive gear comprising a cam track defining disc disposed in a plane parallel to said first mentioned disc, the cam track adapted for successive reception of the cam follower projections to intermittently drive said driven gear through a plurality of angular phases for each cycle of said drive gear, the cam track being curved with a clevis between track parts corresponding to the interval between the motion phases of said driven gear, and auxiliary gear control means for relative movement of said drive and driven gears as each follower projection moves across said clevis in non-driving relationship with said cam track.

5. An intermittent motion device as defined in claim 4 in which the cam track is heart-shaped, there being four cam followers equally spaced about the center of said driven gear and projecting normally therefrom for successive driving engagement in said cam track, the auxiliary gear control means defining a recess and being mounted corotationally with said drive gear, a sprocket tooth extending radially in the plane of said gear and arranged in association with each cam follower to engage in said recess each time a follower is in said clevis to condition the gears for controlled relative motion as the followers move across the clevis as the result of motion relatively initiated in said driven gears.

References Cited

UNITED STATES PATENTS

| 2,017,855 | 10/1935 | Foster | 226—152 |
| 2,596,581 | 5/1952 | Mercier | 352—188 |

FOREIGN PATENTS

| 569,949 | 2/1959 | Canada. |
| 1,111,794 | 9/1954 | France. |

EVON C. BLUNK, *Primary Examiner.*

H. C. HORNSBY, *Assistant Examiner.*